US007943105B2

(12) United States Patent
Farha

(10) Patent No.: US 7,943,105 B2
(45) Date of Patent: *May 17, 2011

(54) SULFUR REMOVAL USING FERROUS CARBONATE ABSORBENT

(75) Inventor: Floyd E. Farha, Oklahoma City, OK (US)

(73) Assignee: New Technology Ventures, Inc., Oklahoma City, OK (US)

( * ) Notice: Subject to any disclaimer, the term of this patent is extended or adjusted under 35 U.S.C. 154(b) by 143 days.

This patent is subject to a terminal disclaimer.

(21) Appl. No.: 11/997,229

(22) PCT Filed: Sep. 15, 2006

(86) PCT No.: PCT/US2006/035911
§ 371 (c)(1),
(2), (4) Date: Jan. 29, 2008

(87) PCT Pub. No.: WO2007/035435
PCT Pub. Date: Mar. 29, 2007

(65) Prior Publication Data
US 2008/0190852 A1    Aug. 14, 2008

Related U.S. Application Data

(63) Continuation-in-part of application No. 11/228,713, filed on Sep. 15, 2005, now Pat. No. 7,744,841.

(51) Int. Cl.
*B01D 53/56* (2006.01)
(52) U.S. Cl. .................................... 423/244.01; 502/51
(58) Field of Classification Search .................. 502/406, 502/404, 416, 439, 51; 423/230, 232, 244.01
See application file for complete search history.

(56) References Cited

U.S. PATENT DOCUMENTS

| 1,882,000 | A |   | 10/1932 | Cross |
| 2,433,426 | A |   | 12/1947 | Capell et al. |
| 4,008,775 | A |   | 2/1977 | Fox |
| 4,061,716 | A | * | 12/1977 | McGauley ............... 423/244.06 |
| 4,323,544 | A | * | 4/1982 | Magder ...................... 423/239.1 |
| 4,344,842 | A |   | 8/1982 | Fox |
| 4,366,131 | A |   | 12/1982 | Fox |
| 4,376,032 | A |   | 3/1983 | Givens |
| 4,476,027 | A |   | 10/1984 | Fox |
| 4,705,638 | A |   | 11/1987 | Ganczarczyk |
| 4,956,160 | A |   | 9/1990 | Reichert |
| 5,378,443 | A | * | 1/1995 | Engstrom et al. .......... 423/239.1 |
| 5,914,292 | A | * | 6/1999 | Khare et al. .................. 502/406 |
| 5,948,269 | A |   | 9/1999 | Stone |
| 6,096,194 | A |   | 8/2000 | Tsybulevskiy et al. |
| 6,221,241 | B1 |   | 4/2001 | Carnell et al. |
| 6,500,237 | B2 |   | 12/2002 | Winchester et al. |

FOREIGN PATENT DOCUMENTS

SU      914611 A1    3/1982

OTHER PUBLICATIONS

"H2S Scavenger Technolgies," GRI Report No. GRI-94/0197 by A.J. Foral & B.H. Al-Ubaidi, The M.W. Kellogg Co., for Gas Research Institute—Report Period Jun. 1 to Aug. 31, 1993.
"Desulfurization of Biogas Research & Possibilities for Greenspring," by Arne Feldmeier & Christoph Hanrott for Bioway bv, undated.
Database WPI Week 198305 Thomson Scientific, London, GB; AN 1983-11512K, XP002564632.
Roberts, M.J., et al., "Pressurized fluidized-bed hydroretorting of Eastern oil shales—sulfur control. Topical report for Subtask 3.1, In-bed sulfur capture tests; Subtask 3.2, Electrostatic desulfurization; Subtask 3.3, Microbial desulfurization and denitrification" May 1, 1992 XP002564633 US DOI: 10.2172/10181821 Dept. of Energy—Office of Scientific and Technical Information, URL: http://dx.org/10.2172/10181821, p. 24, paragraph 3, pg. 25, paragraph 5.

* cited by examiner

*Primary Examiner* — Edward M Johnson
(74) *Attorney, Agent, or Firm* — Locke Lord Bissell & Liddell, LLP

(57) ABSTRACT

Finely divided ferrous carbonate absorbent, siderite granules or absorbent particles made by mixing, agglomerating and shaping finely powdered ferrous carbonate, preferably siderite, in combination with minor effective amounts of water or an optional binder, followed by drying, are used to treat and significantly reduce concentrations of hydrogen sulfide, carbonyl sulfide, organic disulfides, mercaptans and other sulfurous compounds and contaminants in gaseous and liquid fluid streams such as natural gas, light hydrocarbon streams, crude oil, acid gas mixtures, carbon dioxide gas and liquid streams, anaerobic gas, landfill gas, geothermal gases and liquids, and the like. Methods for absorbing sulfur compounds in a moist atmospheric environment and for regenerating the absorbent by contacting it with air and steam or, continuously, by mixing the feed stream with moist air are also disclosed.

10 Claims, No Drawings

SULFUR REMOVAL USING FERROUS CARBONATE ABSORBENT

CROSS-REFERENCE TO RELATED APPLICATIONS

This application is a U.S. National Stage filing under 35 U.S.C. §371 of PCT/US06/35911, filed Sep. 15, 2006, which is a continuation-in-part of U.S. application Ser. No. 11/228,713, filed Sep. 15, 2005 now U.S. Pat. No. 7,744,841.

BACKGROUND OF THE INVENTION

1. Field of the Invention

This invention relates to an absorbent composition useful for removing sulfur-containing compounds from a variety of fluids, and particularly from liquid and gaseous hydrocarbons and carbon dioxide. The absorbent primarily comprises ferrous carbonate, desirably obtained from the mineral siderite, and is used for removing hydrogen sulfide, mercaptans, dimethyl disulfide and other sulfur-containing compounds from gaseous hydrocarbon streams, light liquid hydrocarbon streams such as natural gas liquids ("NGL"), crude oil, acid-gas mixtures, carbon dioxide gas and liquid, anaerobic gas, landfill gas, geothermal gas, and the like. Methods for making and using the absorbent for sulfur removal are also disclosed.

2. Description of Related Art

Because of the noxious, toxic and corrosive nature of sulfur-containing compounds, many different products and methods have previously been disclosed for use in removing such compounds from liquid and gaseous streams. One such commercially available product is SULFATREAT® brand particulate reactant that is said to be useful for removing hydrogen sulfide and other sulfur contaminants from gases and liquids including, for example, hydrocarbon fuels and geothermal steam for sale to producers of natural gas and the like. SULFATREAT® is a federally registered trademark of M-I L.L.C. of Houston, Tex., and, in stylized form, of Gas Sweetener Associates, Inc. of Chesterfield, Mo. The SULFATREAT® material has a proprietary formulation but is believed to comprise primarily ferric oxide particles having a high surface area. Iron sponge is another commercially available material composed of ferric oxide distributed on wood chips that is being used for sulfur removal in industrial processes.

Other iron-containing compositions and methods for removing sulfur from gas and liquid streams are disclosed, for example, in U.S. Pat. Nos. 4,008,775; 4,344,842; 4,366,131; 4,476,027; 4,705,638; 4,956,160 and 5,948,269. U.S. Pat. No. 5,948,269, for example, discloses a process for the removal of dissolved hydrogen sulfide and other malodorous compounds from aqueous liquid or sludge waste systems such as found in sewage collection and treatment works; industrial and commercial waste systems, natural and man-made polluted impoundments or waterways, and septic systems, by use of "alkaline iron." As used in U.S. Pat. No. 5,948,269, "alkaline iron" refers to an alkali with a variety of iron compounds including ferrous carbonate.

SUMMARY OF THE INVENTION

The absorbent and method disclosed herein are particularly effective for absorbing hydrogen sulfide, mercaptans, dimethyldisulfide and other sulfur-containing compounds from natural gas, light hydrocarbon streams such as natural gas liquids, crude oil, acid gas mixtures, carbon dioxide gas and liquid, anaerobic gas, landfill gas, geothermal and other sulfur-containing streams. According to a preferred embodiment of the invention, the subject absorbent comprises ferrous carbonate, most preferably siderite granules or powdered siderite that is extruded or otherwise aggregated, compacted or formed into pellets, prills or spheroids using a minor effective amount of moisture and, optionally, a binder such as calcium aluminate cement or another similarly effective material.

According to another embodiment of the invention, an absorbent bed is disclosed for use in removing sulfur from gas, liquid or mixed gas and liquid streams. Examples of sulfur-containing compounds removed by the absorbent include hydrogen sulfide, mercaptan-containing compounds, organic disulfides and carbonyl sulfide. The absorbent bed desirably comprises a three-dimensional array of closely spaced pellets, prills, or otherwise-manufactured aggregates comprising from about 50 to about 100 weight percent ferrous carbonate, most preferably in the form of particulate siderite (90% through 100 mesh) aggregated using a binder comprising from about two to about ten weight percent calcium aluminate cement. According to a particularly preferred embodiment of the invention, the absorbent comprises dried extrudates containing about 95 weight percent siderite and about 5 weight percent calcium aluminate cement.

According to another embodiment of the invention, an absorbent material is made by mixing about 95 parts by weight particulate siderite (90% through 100 mesh), about 5 parts calcium aluminate cement, and about 20 parts water; compacting the mixture by extrusion or otherwise to produce larger particles, pellets or prills, and thereafter drying the absorbent for a sufficient time to reduce the moisture content to a moisture level less than about three weight percent. According to a particularly preferred embodiment of the invention, the absorbent pellets have a diameter of about $3/16$ inch, a length of about $5/16$ inch, and are dried at about 120° F. for about four hours.

According to another embodiment of the invention, sulfur is removed from a liquid, gas, or mixed gas and liquid stream comprising sulfur-containing compounds by causing the stream to pass through an absorbent bed consisting essentially of particulate material comprising from about 70 to about 100 weight percent ferrous carbonate, preferably in the form of aggregated particulate siderite. The absorbent bed most preferably comprises a plurality of pellets comprising from about 70 to about 100 weight percent ferrous carbonate in combination with an amount of a binder such as calcium aluminate cement that is sufficient to hold the absorbent in a desired physical configuration for a desired service life. It will be appreciated by those of ordinary skill in the art upon reading this disclosure that the amount of the inventive absorbent that is needed in the absorbent bed will depend upon factors such as the absorbent particle size, the bed density, the effective surface area of the absorbent particles, the amount of ferrous carbonate in the absorbent that is available to absorb the sulfur-containing compounds, and the temperature, pressure, velocity and residence time of the gas or liquid stream being treated as it passes through the bed.

According to another embodiment of the invention, ferrous carbonate absorbent that has become blackened is periodically regenerated by contacting the blackened ferrous carbonate with air or another oxygen-containing gas and steam. Such blackening is believed to be caused by the formation of ferrous sulfide on the surface of the ferrous carbonate during the removal of sulfur from a liquid, gas, or mixed gas and liquid stream comprising sulfur-containing compounds.

According to another embodiment of the invention, sulfur is removed from a liquid, gas, or mixed gas and liquid stream comprising sulfur-containing compounds by combining the stream with oxygen and water vapor prior to feeding the stream to a bed of ferrous carbonate. This method is particularly preferred for use in removing sulfur from acid gases.

According to another embodiment of the invention, sulfur is removed from a liquid, gas or mixed gas and liquid stream comprising sulfur-containing compounds by passing the stream through a bed of ferrous carbonate in a moist air environment. By subjecting the ferrous carbonate to moist air or another oxygen-containing gas and water vapor during absorption, the ferrous carbonate is believed to be continuously regenerated by a catalytic effect, ultimately producing elemental sulfur that can be easily separated from the process stream.

According to another embodiment of the invention, a method is disclosed for removing hydrogen sulfide evolved during natural gas drilling operations, the method comprising adding to a drilling mud used in said drilling operations from about 40 to about 400 pounds of a finely ground particulate absorbent (particles passing through a 100 mesh screen), preferably comprising from about 50 to about 90 weight percent ferrous carbonate, per ton of drilling mud. No binder is needed or desirable when the finely ground ferrous carbonate is added to drilling mud according to this embodiment of the invention.

DESCRIPTION OF THE PREFERRED EMBODIMENTS

Applicant has discovered that ferrous carbonate, preferably in the form of the mineral siderite, is an excellent absorbent of hydrogen sulfide, carbonyl sulfide, organic disulfides, mercaptans and other sulfur-containing compounds that are present in various naturally occurring or synthesized gases and liquids, and particularly, in gaseous and liquid hydrocarbons and carbon dioxide. Siderite predominantly comprises ferrous carbonate, and is usually found naturally in combination with some calcium, magnesium or manganese. For use in the compositions and various methods of the invention, the siderite can be sourced in the form of chunks, granules, or finely divided powder. If sourced in chunks, the chunks are desirably reduced to granules of a suitable size or powdered prior to use. For use in bed applications, extrudates, as described below, or comparably sized siderite granules obtained from natural ores are preferred. If siderite is sourced in the form of a finely ground powder, the powder is desirably agglomerated and extruded or otherwise shaped prior to use, except when intended for use in applications such as drilling muds, where the use of siderite powder is recommended without prior agglomeration to form larger particles.

In some cases, merely adding up to about 20 weight percent water to the siderite powder, with mixing, will provided sufficient agglomeration to permit powdered siderite to be extruded into pellets of suitable size or strands that, when dried and subsequently handled, will be friable or easily broken into granules that are satisfactory for use in absorption beds through which sulfur-containing liquids or gases can be passed or circulated for sulfur removal. In some cases, the use of a minor effective amount of a binder, most preferably a cementitious material as further described below may be desirable for use in agglomerating finely divided ferrous carbonate powders.

Although it will be appreciated upon reading this disclosure that ferrous carbonate can be synthesized, the use of ferrous carbonate obtained in naturally occurring siderite mineral ores is preferred for economic reasons. *Hawley's Condensed Chemical Dictionary* (Twelfth Edition) reports that siderite ores naturally occur in Vermont, Massachusetts, Connecticut, New York, North Carolina, Pennsylvania, Ohio and Europe.

Extrudates useful in the absorbent bed of the invention can be prepared by mixing powdered siderite with a minor effective amount, such as about 5 weight percent of the total, of a binder such as calcium aluminate cement or another similarly effective material that does not significantly detract from the ability of the siderite to absorb sulfur or sulfur-containing compounds from a gas or liquid stream. A preferred calcium aluminate cement for use in the invention is marketed under the trademark FONDU® by Lafarge Aluminate of Chesapeake, Va. According to a particularly preferred embodiment of the invention, about 5 parts by weight calcium aluminate cement is blended into about 95 parts by weight siderite powder (90% through 100 mesh) to distribute the cement throughout the siderite.

About 20 parts by weight water per 100 parts by weight of blended siderite and cement is desirably admixed with the solids to hydrate the binder and facilitate the formation of larger aggregates, which are then dried to a desired moisture content. Most preferably, the siderite, cement and water mixture is extruded and chopped, such as by use of a rotary pelletizer, or otherwise divided or broken, into extrudates having a diameter of approximately 3/16 inch and a length of approximately 5/16 inch. The extrudates produced from powder as described above are desirably dried at a temperature of about 120° F. for about four hours. Although the required drying time can vary according to the size and dimensions of the pellets, the drying temperature and the humidity of the ambient air, the moisture content of the aggregated solids is desirably reduced to less than about three weight percent during the drying stage.

The absorbent and method disclosed herein are particularly effective for absorbing hydrogen sulfide, mercaptans, dimethyldisulfide and other sulfur compounds from natural gas, light hydrocarbon streams such as NGL, crude oil, acid gas mixtures, carbon dioxide gas and liquid, anaerobic gas, landfill gas, geothermal and other sulfur-containing streams. For most applications, the sulfur-containing fluid to be treated is passed through a bed of the subject absorbent pellets or granules that are disposed inside a vessel such as a cylindrical tower. The amount of absorbent that is needed in the absorbent bed will depend upon many factors such as the sulfur content in the feed, the desired sulfur content in the effluent, the desired lifetime of an absorbent charge, the absorbent particle size, the bed density, the effective surface area of the absorbent particles, the amount of ferrous carbonate in the absorbent that is available to absorb the sulfur-containing compounds, and the temperature, pressure, velocity and residence time of the gas or liquid stream being treated as it passes through the bed. For some applications, such as the treatment of sour gases encountered during well drilling operations, granulated siderite absorbent that passes through a 100 mesh sieve can also be beneficially used by combining it with another material such as drilling mud being pumped into a well.

Although extrudates having dimensions ranging from about 1/16 inch to about 1/4 inch are a particularly preferred form for use of the subject absorbent, it will be appreciated that granules of suitable size can be produced by pulverizing siderite chunks in a hammer mill or by using other commercially available devices well known to those of ordinary skill in the art, and thereafter screening to a suitable particle size range preferably not exceeding about 5/16 inch. Similarly, where siderite powder or synthetically produced ferrous carbonate powder is the starting material, means other than extrusion can also be used for agglomerating or densifying the powder for use in various sulfur removal processes. Such other means include, for example, hydraulically actuated presses or other compaction devices. In most cases, minor effective amounts of a binder and water are desirably added to the powdered siderite or ferrous carbonate to facilitate agglomeration of the individual mineral particles into larger solid bodies, provided that the binder does not too greatly reduce the effective surface area of the absorbent.

Representative Siderite Analysis

A processed siderite composition having a bulk density of 110 pounds per cubic foot, a specific gravity of 3.63 and a particle size of 90% through 100 mesh, has the following analysis:

|   | wt % |
|---|---|
| Fe (elemental) | 43.00% |
| $FeCO_3$ | 86.87 |
| $SiO_2$ | 5.50 |
| $Al_2O_3$ | 1.30 |
| CaO | 0.56 |
| MgO | 0.53 |
| S | 0.40 |
| Mn | 0.35 |
| Cu | 0.30 |
| Co | 0.02 |
| Cd | 0.0041 |
| Pb | 0.0001 |
| As | 0.00005 |
| Sb | 0.00005 |
| $Fe_2O_3$ | <1.0 |

Sample A

To demonstrate the utility of the invention, a finely divided siderite powder (90% through 100 mesh) was blended with calcium aluminate cement in a ratio of 95 parts siderite to 5 parts cement by weight. Approximately 20 parts by weight water were blended with the siderite and cement mixture, and the mixture was then extruded to produce a plurality of extrudates having a diameter of about 3/16 inch and a length of about 5/16 inch. These extrudates were dried at 120 degrees F. for four hours to a moisture content less than about 3 wt. %.

Sample B

Another siderite material was produced by obtaining chunks of siderite ore approximately 3 to 4 inches in diameter and grinding them to produce granular particles comprising about 90 wt. % ferrous carbonate and ranging in size from about 1/8 inch to about 1/4 inch. Dirt and other contaminants were removed from the granulated siderite using a sieve.

The usefulness of the absorbent materials, when prepared as described above, for removing sulfur from gas and liquid streams containing sulfurous compounds is further described and explained in relation to the examples presented below. All stated inlet and outlet compositions are in parts per million (ppm). Front end sulfurs are stated in ppm of the sulfur-containing compound by weight of the fluid stream. Thiols are stated in ppm of the respective thiol by weight of the fluid stream. (Some decimal values throughout the Tables below are rounded due to space considerations.)

EXAMPLE 1

A stream of carbon dioxide acid gas was charged at a rate of about 60 mls per minute in an upflow direction through a vertical iron pellet treater containing a bed approximately 8 inches high and 2 inches in diameter of the Sample A extrudates prepared as described above. The treater temperature was 68 deg. F. and the treater pressure was 200 psig. The inlet and outlet compositions of the gas are set forth in Table 1 below:

TABLE 1

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 7.7 | 13307.3 | 0.4 | 2.4 | 575.2 | 481.3 | 1.3 |
| Outlet | 4.1 | 2.6 | 1.0 | 0.7 | 50.5 | 17.6 | 0.3 |
| % Reduction | 46.9 | 99.9 | −135 | 72.1 | 91.2 | 96.3 | 78.4 |

EXAMPLE 2

A stream of carbon dioxide acid gas was charged at a rate of about 60 mls per minute in an upflow direction through a vertical $H_2S$ absorbent treater containing a bed approximately 8 inches high and 2 inches in diameter of the Sample B granules prepared as described above. The treater temperature was 68 deg. F. and the treater pressure was 200 psig. The inlet and outlet compositions of the gas are set forth in Table 2 below:

TABLE 2

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 7.7 | 13307.3 | 0.4 | 2.4 | 575.2 | 481.3 | 1.3 |
| Outlet | 4.4 | 0.2 | 7.6 | 20.6 | 1.5 | 0.3 | 0.01 |
| % Reduction | 42.8 | 100 | −1780 | −765 | 99.7 | 100 | 99.2 |

EXAMPLE 3

A stream of natural gas was charged at a rate of about 60 mls per minute in an upflow direction through a vertical iron pellet treater containing a bed approximately 8 inches high and 2 inches in diameter of the Sample A extrudates prepared as described above. The treater temperature was 70 deg. F. and the treater pressure was 500 psig. The inlet and outlet compositions of the gas are set forth in Table 3 below:

TABLE 3

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 2.6 | 93.5 | 2.8 | 1.6 | 90.7 | 110.3 | 7.2 |
| Outlet | 1.9 | 0.9 | 2.2 | 1.4 | 6.6 | 16.9 | 1.4 |
| % Reduction | 25.7 | 99.0 | 22.8 | 11.9 | 92.7 | 84.7 | 80.1 |

EXAMPLE 4

A stream of natural gas was charged at a rate of about 60 mls per minute in an upflow direction through a vertical H₂S absorbent treater containing a bed approximately 8 inches high and 2 inches in diameter of the Sample B granules prepared as described above. The treater temperature was 70 deg. F. and the treater pressure was 500 psig. The inlet and outlet compositions of the gas are set forth in Table 4 below:

TABLE 4

| Treater Sample | Front End Sulfurs | | | | Thiols | | |
|---|---|---|---|---|---|---|---|
| Points | COS | H₂S | CS₂ | DMDS | Methyl | Ethyl | 1-Propyl |
| Inlet | 2.6 | 93.5 | 2.8 | 1.6 | 90.7 | 110.3 | 7.2 |
| Outlet | 1.8 | 0.01 | 2.3 | 1.1 | 0.3 | 0.1 | 0.01 |
| % Reduction | 29 | 100 | 16.8 | 35.1 | 99.7 | 99.9 | 99.9 |

EXAMPLE 5

A stream of natural gas was charged at a rate of about 60 mls per minute in an upflow direction through a vertical iron pellet treater containing a bed approximately 8 inches high and 2 inches in diameter of the Sample A extrudates prepared as described above. The treater temperature was 70 deg. F. and the treater pressure was 500 psig. The inlet and outlet compositions of the gas are set forth in Table 5 below:

TABLE 5

| Treater Sample | Front End Sulfurs | | | | Thiols | | |
|---|---|---|---|---|---|---|---|
| Points | COS | H₂S | CS₂ | DMDS | Methyl | Ethyl | 1-Propyl |
| Inlet | 2.6 | 92.9 | 2.5 | 1.8 | 89.5 | 102.6 | 7.0 |
| Outlet | 2.2 | 1.5 | 1.9 | 1.3 | 10.2 | 17.2 | 1.5 |
| % Reduction | 16.5 | 98.3 | 25.1 | 27.6 | 88.6 | 83.2 | 78.4 |

EXAMPLE 6

A stream of natural gas was charged at a rate of about 60 mls per minute in an upflow direction through a vertical H₂S absorbent treater containing a bed approximately 8 inches high and 2 inches in diameter of the Sample B granules prepared as described above. The treater temperature was 70 deg. F. and the treater pressure was 500 psig. The inlet and outlet compositions of the gas are set forth in Table 6 below:

TABLE 6

| Treater Sample | Front End Sulfurs | | | | Thiols | | |
|---|---|---|---|---|---|---|---|
| Points | COS | H₂S | CS₂ | DMDS | Methyl | Ethyl | 1-Propyl |
| Inlet | 2.6 | 92.3 | 2.5 | 1.8 | 89.5 | 102.6 | 7.0 |
| Outlet | 1.8 | 0.01 | 1.7 | 1.2 | 0.1 | 0.2 | 0.03 |
| % Reduction | 30.3 | 100 | 33.3 | 31.3 | 99.9 | 99.8 | 99.6 |

EXAMPLE 7

A stream of natural gas was charged at a rate of about 60 mls per minute in an upflow direction through a vertical iron pellet treater containing a bed approximately 8 inches high and 2 inches in diameter of the Sample A extrudates prepared as described above. The treater temperature was 100 deg. F. and the treater pressure was 500 psig. The inlet and outlet compositions of the gas are set forth in Table 7 below:

TABLE 7

| Treater Sample | Front End Sulfurs | | | | Thiols | | |
|---|---|---|---|---|---|---|---|
| Points | COS | H₂S | CS₂ | DMDS | Methyl | Ethyl | 1-Propyl |
| Inlet | 1.8 | 225.9 | 1.7 | 6.3 | 126.6 | 78.1 | 2.3 |
| Outlet | 0.3 | 0.7 | 1.6 | 4.4 | 94.4 | 65.3 | 1.9 |
| % Reduction | 81.5 | 99.7 | 10.5 | 29.8 | 25.4 | 16.4 | 14.5 |

EXAMPLE 8

A stream of natural gas was charged at a rate of about 60 mls per minute in an upflow direction through a vertical H₂S absorbent treater containing a bed approximately 8 inches high and 2 inches in diameter of the Sample B granules prepared as described above. The treater temperature was 100 deg. F. and the treater pressure was 500 psig. The inlet and outlet compositions of the gas are set forth in Table 8 below:

TABLE 8

| Treater Sample | Front End Sulfurs | | | | Thiols | | |
|---|---|---|---|---|---|---|---|
| Points | COS | H₂S | CS₂ | DMDS | Methyl | Ethyl | 1-Propyl |
| Inlet | 1.8 | 225.9 | 1.7 | 6.3 | 126.6 | 78.1 | 2.3 |
| Outlet | 0.5 | 2.7 | 0.9 | 13.2 | 86.0 | 58.2 | 1.7 |
| % Reduction | 74.0 | 98.8 | 50.2 | −111.5 | 32.1 | 25.5 | 24.4 |

EXAMPLE 9

A stream of natural gas was charged at a rate of about 60 mls per minute in an upflow direction through a vertical iron pellet treater containing a bed approximately 8 inches high and 2 inches in diameter of the Sample A extrudates prepared as described above. The treater temperature was 130 deg. F. and the treater pressure was 500 psig. The inlet and outlet compositions of the gas are set forth in Table 9 below:

TABLE 9

| Treater Sample | Front End Sulfurs | | | | Thiols | | |
|---|---|---|---|---|---|---|---|
| Points | COS | H₂S | CS₂ | DMDS | Methyl | Ethyl | 1-Propyl |
| Inlet | 1.9 | 225.2 | 1.6 | 6.3 | 102.7 | 80.2 | 2.2 |
| Outlet | 0.3 | 0.6 | 1.2 | 2.9 | 82.7 | 65.1 | 1.7 |
| % Reduction | 82.6 | 99.7 | 25.1 | 53.0 | 19.5 | 18.9 | 21.9 |

EXAMPLE 10

A stream of natural gas was charged at a rate of about 60 mls per minute in an upflow direction through a vertical H₂S absorbent treater containing a bed approximately 8 inches high and 2 inches in diameter of the Sample B granules prepared as described above. The treater temperature was 130 deg. F. and the treater pressure was 500 psig. The inlet and outlet compositions of the gas are set forth in Table 10 below:

TABLE 10

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 1.9 | 225.2 | 1.7 | 6.3 | 102.7 | 80.2 | 2.2 |
| Outlet | 0.4 | 6.9 | 0.7 | 1.4 | 62.0 | 51.4 | 1.8 |
| % Reduction | 78.4 | 96.9 | 55.0 | 77.1 | 39.7 | 35.9 | 16.6 |

EXAMPLE 11

A stream of natural gas liquid was charged at a rate of about 40 mls per minute in an upflow direction through a vertical iron pellet treater containing a bed approximately 8 inches high and 2 inches in diameter of the Sample A extrudates prepared as described above. The treater temperature was 52 deg. F. and the treater pressure was 500 psig. The inlet and outlet compositions of the gas are set forth in Table 11 below:

TABLE 11

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 6.6 | 0.01 | 0.7 | 0.24 | 14.9 | 25.7 | 18.9 |
| Outlet | 6.3 | 0.01 | 21.8 | 1.6 | 2.0 | 3.1 | 2.7 |
| % Reduction | 4.8 | 0.0 | −3303 | −672.3 | 86.4 | 87.8 | 85.8 |

EXAMPLE 12

A stream of natural gas liquid was charged at a rate of about 40 mls per minute in an upflow direction through a vertical iron pellet treater containing a bed approximately 8 inches high and 2 inches in diameter of the Sample A extrudates prepared as described above. The treater temperature was 52 deg. F. and the treater pressure was 500 psig. The inlet and outlet compositions of the gas are set forth in Table 12 below:

TABLE 12

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 7.0 | 0.01 | 0.7 | 0.1 | 20.3 | 26.1 | 18.0 |
| Outlet | 6.3 | 0.01 | 6.5 | 0.7 | 0.9 | 1.8 | 2.2 |
| % Reduction | 9.1 | 0.0 | −866 | −763.3 | 95.5 | 93.2 | 87.7 |

EXAMPLE 13

A stream of natural gas liquid was charged at a rate of about 40 mls per minute in an upflow direction through a vertical iron pellet treater containing a bed approximately 8 inches high and 2 inches in diameter of the Sample A extrudates prepared as described above. The treater temperature was 60 deg. F. and the treater pressure was 500 psig. The inlet and outlet compositions of the gas are set forth in Table 13 below:

TABLE 13

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 7.2 | 0.62 | 3.9 | 0.3 | 16.3 | 21.9 | 17.9 |
| Outlet | 6.8 | 0.01 | 0.1 | 0.1 | 0.7 | 1.3 | 1.7 |
| % Reduction | 6.1 | 98.4 | 97.5 | 63.0 | 95.6 | 93.9 | 90.3 |

EXAMPLE 14

A stream of natural gas liquid was charged at a rate of about 40 mls per minute in an upflow direction through a vertical iron pellet treater containing a bed approximately 8 inches high and 2 inches in diameter of the Sample A extrudates prepared as described above. The treater temperature was 60 deg. F. and the treater pressure was 500 psig. The inlet and outlet compositions of the gas are set forth in Table 14 below:

TABLE 14

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 7.2 | 0.7 | 3.8 | 0.34 | 16.5 | 21.9 | 17.9 |
| Outlet | 6.8 | 0.01 | 6.5 | 0.1 | 0.5 | 1.3 | 1.6 |
| % Reduction | 5.7 | 98.6 | −98.0 | 72.1 | 97.0 | 94.2 | 91.3 |

EXAMPLE 15

A stream of carbon dioxide gas was charged at a rate of about 40 mls per minute in an upflow direction through a vertical iron pellet treater containing a bed approximately 8 inches high and 2 inches in diameter of the Sample A extrudates prepared as described above. The treater temperature was 52 deg. F. and the treater pressure was 500 psig. The inlet and outlet compositions of the gas are set forth in Table 15 below:

TABLE 15

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 261.5 | 201.3 | 177.7 | 12.9 | 199.1 | 188.8 | 0.01 |
| Outlet | 252.8 | 0.01 | 159.3 | 0.5 | 0.01 | 0.01 | 0.01 |
| % Reduction | 3.3 | 100 | 10.4 | 96.3 | 100 | 100 | 0 |

EXAMPLE 16

A stream of carbon dioxide gas was charged at a rate of about 40 mls per minute in an upflow direction through a vertical iron pellet treater containing a bed approximately 8 inches high and 2 inches in diameter of the Sample A extrudates prepared as described above. The treater temperature was 52 deg. F. and the treater pressure was 500 psig. The inlet and outlet compositions of the gas are set forth in Table 16 below:

TABLE 16

| Treater Sample Points | Front End Sulfurs | | | | Thiols | | |
|---|---|---|---|---|---|---|---|
| | COS | H$_2$S | CS$_2$ | DMDS | Methyl | Ethyl | 1-Propyl |
| Inlet | 259.3 | 199.9 | 176.3 | 12.4 | 201.5 | 185.7 | 0.0 |
| Outlet | 248.6 | 0.01 | 166.8 | 0.6 | 0.01 | 0.01 | 0.01 |
| % Reduction | 4.1 | 100 | 5.4 | 95.1 | 100 | 100 | 0 |

EXAMPLE 17

A stream of carbon dioxide gas was charged at a rate of about 40 mls per minute in an upflow direction through a vertical iron pellet treater containing a bed approximately 8 inches high and 2 inches in diameter of the Sample A extrudates prepared as described above. The treater temperature was 52 deg. F. and the treater pressure was 500 psig. The inlet and outlet compositions of the gas are set forth in Table 17 below:

TABLE 17

| Treater Sample Points | Front End Sulfurs | | | | Thiols | | |
|---|---|---|---|---|---|---|---|
| | COS | H$_2$S | CS$_2$ | DMDS | Methyl | Ethyl | 1-Propyl |
| Inlet | 263.1 | 202.5 | 178.1 | 12.7 | 198.7 | 185.0 | 0.01 |
| Outlet | 251.3 | 0.01 | 164.1 | 0.3 | 0.01 | 0.01 | 0.01 |
| % Reduction | 4.5 | 100 | 7.9 | 97.4 | 100 | 100 | 0 |

EXAMPLE 18

A stream of carbon dioxide gas was charged at a rate of about 40 mls per minute in an upflow direction through a vertical iron pellet treater containing a bed approximately 8 inches high and 2 inches in diameter of the Sample A extrudates prepared as described above. The treater temperature was 52 deg. F. and the treater pressure was 500 psig. The inlet and outlet compositions of the gas are set forth in Table 18 below:

TABLE 18

| Treater Sample Points | Front End Sulfurs | | | | Thiols | | |
|---|---|---|---|---|---|---|---|
| | COS | H$_2$S | CS$_2$ | DMDS | Methyl | Ethyl | 1-Propyl |
| Inlet | 256.2 | 193.8 | 183.6 | 18.4 | 178.5 | 174.9 | 0.01 |
| Outlet | 234.2 | 0.01 | 166.6 | 0.4 | 0.01 | 0.01 | 0.01 |
| % Reduction | 8.6 | 100 | 9.3 | 98.1 | 100 | 100 | 0 |

EXAMPLE 19

A stream of carbon dioxide gas was charged at a rate of about 40 mls per minute in an upflow direction through a vertical iron pellet treater containing a bed approximately 8 inches high and 2 inches in diameter of the Sample A extrudates prepared as described above. The treater temperature was 52 deg. F. and the treater pressure was 500 psig. The inlet and outlet compositions of the gas are set forth in Table 19 below:

TABLE 19

| Treater Sample Points | Front End Sulfurs | | | | Thiols | | |
|---|---|---|---|---|---|---|---|
| | COS | H$_2$S | CS$_2$ | DMDS | Methyl | Ethyl | 1-Propyl |
| Inlet | 5.9 | 5.1 | 20.0 | 27.7 | 38.0 | 56.2 | 7.2 |
| Outlet | 4.6 | 0.01 | 1.4 | 0.1 | 2.3 | 1.7 | 0.1 |
| % Reduction | 22.0 | 99.8 | 93.0 | 99.5 | 93.9 | 97.0 | 98.0 |

EXAMPLE 20

A stream of carbon dioxide gas was charged at a rate of about 40 mls per minute in an upflow direction through a vertical iron pellet treater containing a bed approximately 8 inches high and 2 inches in diameter of the Sample A extrudates prepared as described above. The treater temperature was 52 deg. F. and the treater pressure was 500 psig. The inlet and outlet compositions of the gas are set forth in Table 20 below:

TABLE 20

| Treater Sample Points | Front End Sulfurs | | | | Thiols | | |
|---|---|---|---|---|---|---|---|
| | COS | H$_2$S | CS$_2$ | DMDS | Methyl | Ethyl | 1-Propyl |
| Inlet | 6.1 | 5.6 | 19.6 | 27.8 | 38.4 | 56.4 | 7.0 |
| Outlet | 4.7 | 0.01 | 2.2 | 0.2 | 2.1 | 1.4 | 0.2 |
| % Reduction | 23.1 | 99.8 | 89.0 | 99.3 | 94.4 | 97.6 | 97.7 |

EXAMPLE 21

A stream of carbon dioxide gas was charged at a rate of about 40 mls per minute in an upflow direction through a vertical iron pellet treater containing a bed approximately 8 inches high and 2 inches in diameter of the Sample A extrudates prepared as described above. The treater temperature was 60 deg. F. and the treater pressure was 500 psig. The inlet and outlet compositions of the gas are set forth in Table 21 below:

TABLE 21

| Treater Sample Points | Front End Sulfurs | | | | Thiols | | |
|---|---|---|---|---|---|---|---|
| | COS | H$_2$S | CS$_2$ | DMDS | Methyl | Ethyl | 1-Propyl |
| Inlet | 6.2 | 24.0 | 25.9 | 19.5 | 43.7 | 70.4 | 12.5 |
| Outlet | 5.9 | 0.01 | 1.7 | 0.5 | 0.05 | 0.8 | 0.4 |
| % Reduction | 4.7 | 100 | 93.5 | 97.3 | 99.9 | 98.9 | 96.8 |

EXAMPLE 22

A stream of carbon dioxide gas was charged at a rate of about 40 mls per minute in an upflow direction through a vertical iron pellet treater containing a bed approximately 8 inches high and 2 inches in diameter of the Sample A extrudates prepared as described above. The treater temperature was 60 deg. F. and the treater pressure was 500 psig. The inlet and outlet compositions of the gas are set forth in Table 22 below:

TABLE 22

| Treater Sample Points | Front End Sulfurs | | | | Thiols | | |
|---|---|---|---|---|---|---|---|
| | COS | $H_2S$ | $CS_2$ | DMDS | Methyl | Ethyl | 1-Propyl |
| Inlet | 6.5 | 23.9 | 25.7 | 19.3 | 44.2 | 70.2 | 12.5 |
| Outlet | 6.1 | 0.01 | 1.3 | 0.7 | 0.01 | 0.6 | 0.4 |
| % Reduction | 5.4 | 100 | 95.0 | 96.1 | 100 | 99.1 | 96.7 |

The foregoing examples demonstrate the removal of hydrogen sulfide, thiols (mercaptans), disulfides and carbonyl sulfide from NGL liquid and from the gaseous hydrocarbons and carbon dioxide. Dimethyldisulfide (DMDS) can also be removed by absorption using the compositions and method of the invention. The increase in DMDS observed in some of the examples is believed to be the result of oxidative sweetening reactions in which a small amount of oxygen dissolved in the treated fluid was catalyzed by the iron in the absorbent to promote the oxidation of a small amount of methyl mercaptan to form DMDS plus water.

Increases in the level of carbon disulfide were also noticed in some of the examples. The sulfur analyses were done by sulfur chemiluminescence. Carbon disulfide analysis is very sensitive to the analytical technique used. Since the level of carbon disulfide is very low in the feed, small changes in composition can cause large errors. Errors can also occur because carbon disulfide often contaminates the feed lines, which can thereafter release small amounts of carbon disulfide without notice. When the feed lines were freshly replaced, no reduction in the carbon disulfide content of the fluid stream was measured, and it is believed that little or no carbon disulfide was removed by the absorbent.

The data from Tables 1 and 2 demonstrate that both forms of the absorbent, extrudates (Sample A material) and granules (Sample B material), remove essentially all of the hydrogen sulfide from a $CO_2$ acid gas stream at ambient temperatures. About half the carbonyl sulfide was removed over both physical forms of the absorbents. The thiols (mercaptans) were also removed at high levels over the granules (99-100%) and over the extrudates (78-96%).

The data from Tables 3-6 demonstrate that 99 to 100% of the hydrogen sulfide can be removed from natural gas at ambient temperatures using the absorbent and method of the invention. The data further demonstrate the removal of 78-100% of the thiols, along with some removal of both carbonyl sulfide and DMDS from the treated fluids.

Comparison of Tables 3-6 (70° F. data) with Tables 7-8 (100° F. data) and Tables 9-10 (130° F. data) shows the effect of temperature. The data demonstrate that 99 to 100% of the hydrogen sulfide is removed at all temperatures using the subject absorbent and method. The thiol removal decreased with increasing temperatures, suggesting that the thiols are desorbing at the higher temperatures. Conversely, the removal of carbonyl sulfide and DMDS increased with increasing temperatures within the ranges tested.

The tests done using a gaseous carbon dioxide feed demonstrate that increasing the pressure from 200 psig (see Tables 1 and 2) to 500 psig (see Tables 15 through 22) appears to aid in the absorption of the thiols. DMDS was 95 to 96% removed at the higher pressure, in comparison to 20 to 72% removal at 200 psig.

NGL liquids tend to be low in hydrogen sulfide concentration. Without competition from hydrogen sulfide, the thiols are removed at levels ranging from 86 to 96% (see Tables 11, 12, 13 and 14). Since oxygen is soluble in this kind of hydrocarbon, the production of DMDS in some the runs may be attributable to the oxidative conversion of small amounts of methyl thiol to DMDS as noted above.

Following use in the iron pellet treater, the Sample A material was removed and examined. The extrudates were uniformly dark from the edge to center after having absorbed 1.2 weight percent sulfur, by weight of the extrudate, from the treated fluid. This observation suggests the occurrence of an exchange reaction during use that causes the sulfur to migrate toward the center of the absorbent. Based upon the composition of the absorbent, the dark (black) color is believed to be ferrous sulfide. The removed extrudates became hot (>135° F.) while sitting out at room temperature, suggesting that the used material is pyrophoric. After sitting out overnight, the used material returned to a lighter brown color more similar to that of the original, pre-use extrudates.

The general conclusion to be drawn from the data presented above is that siderite, whether in the form of granules or in the form of extrudates made from siderite powder, is an excellent absorbent for hydrogen sulfide, thiols (mercaptans), DMDS and carbonyl sulfide in a variety of feed streams. When the reaction conditions favor hydrogen sulfide removal, i.e., higher temperatures and pressures, the thiol removal decreases. The thiols are removed more favorably when the hydrogen sulfide level is low in the feed, at low temperatures, and at high pressures.

Ferrous carbonate absorbent that has become blackened can be regenerated periodically by contacting the blackened ferrous carbonate with air and steam. Such blackening is believed to be caused by the formation of ferrous sulfide on the surface of the ferrous carbonate during the removal of sulfur from a liquid, gas, or mixed gas and liquid stream comprising sulfur-containing compounds.

According to another method of the invention, sulfur is removed from a liquid, gas, or mixed gas and liquid stream comprising sulfur-containing compounds by combining the stream with oxygen and water vapor prior to feeding the stream to a bed of ferrous carbonate. This method is particularly preferred for use in removing sulfur from acid gases but is not preferred for use in natural gas streams because of the economic disadvantages in subsequently separating the air and hydrocarbons.

Alternatively, sulfur can be removed from a liquid, gas or mixed gas and liquid stream comprising sulfur-containing compounds by passing the stream through a bed of ferrous carbonate in a moist air environment. By subjecting the ferrous carbonate to moist air or to oxygen and water vapor during absorption, the ferrous carbonate is believed to be continuously regenerated by a catalytic effect, ultimately producing elemental sulfur that can be easily separated from the process stream. Siderite is also a particularly preferred ferrous carbonate material for use as the absorbent in practicing these methods of the invention.

The following additional Examples demonstrate the efficacy of removing sulfur from an acid gas stream combined with air by passing the stream through a bed of ferrous carbonate in the form of siderite pellets. In each example, the treater was 24 inches high and 2 inches diameter, and had a treater bed L/D ratio of 4:1 with catalyst/absorbent bed dimensions of 8 inches high by 2 inches diameter.

EXAMPLE 23

A stream of acid gas mixture containing 93.596% air, 6.328% carbon dioxide and 0.076% hydrogen sulfide with an inlet gas moisture content of 120.4 lbs/MM SCF was charged at a rate of about 30 mls per minute in an upflow direction through a vertical iron pellet treater containing a bed of SUL-FURTRAP 3/16 inch siderite pellets. The treater temperature was 100 deg. F. and the treater pressure was 100 psig. The inlet and outlet compositions of the gas are set forth in Table 23 below:

TABLE 23

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 0.32 | 758.5 | 1.04 | 0.05 | 1.62 | 0.09 | 0.03 |
| Outlet | 0.21 | 0.18 | 0.53 | 0.04 | 0.01 | 0.01 | 0.01 |
| % Reduction | 32.3 | 99.98 | 49.33 | 10.4 | 99.4 | 88.2 | 61.5 |

EXAMPLE 24

A stream of acid gas mixture containing 93.596% air, 6.328% carbon dioxide and 0.076% hydrogen sulfide with an inlet gas moisture content of 120.4 lbs/MM SCF was charged at a rate of about 30 mls per minute in an upflow direction through a vertical iron pellet treater containing a bed of SUL-FURTRAP 1/8 inch siderite pellets. The treater temperature was 100 deg. F. and the treater pressure was 100 psig. The inlet and outlet compositions of the gas are set forth in Table 24 below:

TABLE 24

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 0.32 | 758.5 | 1.04 | 0.05 | 1.62 | 0.09 | 0.03 |
| Outlet | 0.3 | 0.038 | 0.93 | 0.05 | 0.01 | 0.01 | 0.01 |
| % Reduction | 5.7 | 99.99 | 10.5 | 6.3 | 99.4 | 88.2 | 61.5 |

EXAMPLE 25

A stream of acid gas mixture containing 92.178% air, 7.535% carbon dioxide and 0.287% hydrogen sulfide with an inlet gas moisture content of 42.6 lbs/MM SCF was charged at a rate of about 60 mls per minute in an upflow direction through a vertical iron pellet treater containing a bed of SUL-FURTRAP 3/16 inch siderite pellets. The treater temperature was 100 deg. F. and the treater pressure was 100 psig. The inlet and outlet compositions of the gas are set forth in Table 25 below:

TABLE 25

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 0.144 | 2874.6 | 0.24 | 0.03 | 0.98 | 0.04 | 0.01 |
| Outlet | 0.135 | 0.1 | 0.17 | 0.01 | 0.01 | 0.01 | 0.01 |
| % Reduction | 6.3 | 100.0 | 30.08 | 68.8 | 99.0 | 72.2 | 0.0 |

EXAMPLE 26

A stream of acid gas mixture containing 92.178% air, 7.535% carbon dioxide and 0.287% hydrogen sulfide with an inlet gas moisture content of 42.6 lbs/MM SCF was charged at a rate of about 60 mls per minute in an upflow direction through a vertical iron pellet treater containing a bed of SUL-FURTRAP 1/8 inch siderite pellets. The treater temperature was 100 deg. F. and the treater pressure was 100 psig. The inlet and outlet compositions of the gas are set forth in Table 26 below:

TABLE 26

| Treater Sample Points | Front End Sulfurs | | | | Thiols | | |
|---|---|---|---|---|---|---|---|
| | COS | $H_2S$ | $CS_2$ | DMDS | Methyl | Ethyl | 1-Propyl |
| Inlet | 0.144 | 2874.6 | 0.24 | 0.03 | 0.98 | 0.04 | 0.01 |
| Outlet | 1.42 | 0.067 | 1.78 | 0.01 | 0.01 | 0.01 | 0.01 |
| % Reduction | −844.0 | 100.0 | −653.4 | 68.8 | 99.0 | 72.2 | 0.0 |

EXAMPLE 27

A stream of acid gas mixture containing 90.548% air, 9.221% carbon dioxide and 0.231% hydrogen sulfide with an inlet gas moisture content of 126.2 lbs/MM SCF was charged at a rate of about 100 mls per minute in an upflow direction through a vertical iron pellet treater containing a bed of SUL-FURTRAP 3/16 inch siderite pellets. The treater temperature was 100 deg. F. and the treater pressure was 100 psig. The inlet and outlet compositions of the gas are set forth in Table 27 below:

TABLE 27

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 6.81 | 2308.8 | 0.59 | 0.01 | 1.29 | 0.10 | 0.01 |
| Outlet | 0.21 | 0.1 | 0.49 | 0.01 | 0.01 | 0.01 | 0.01 |
| % Reduction | 97.0 | 100.0 | 16.4 | 0.0 | 99.2 | 90.1 | 0.0 |

EXAMPLE 28

A stream of acid gas mixture containing 90.548% air, 9.221% carbon dioxide and 0.231% hydrogen sulfide with an inlet gas moisture content of 126.2 lbs/MM SCF was charged at a rate of about 100 mls per minute in an upflow direction through a vertical iron pellet treater containing a bed of SULFURTRAP ⅛ inch siderite pellets. The treater temperature was 100 deg. F. and the treater pressure was 100 psig. The inlet and outlet compositions of the gas are set forth in Table 28 below:

TABLE 28

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 6.81 | 2308.8 | 0.59 | 0.01 | 1.29 | 0.10 | 0.01 |
| Outlet | 0.47 | 0.37 | 0.32 | 0.01 | 0.01 | 0.01 | 0.01 |
| % Reduction | 93.14 | 100.0 | 45.7 | 0.0 | 99.2 | 90.1 | 0.0 |

EXAMPLE 29

A stream of acid gas mixture containing 99.315% air, 0.619% carbon dioxide and 0.066% hydrogen sulfide with an inlet gas moisture content of 140.5 lbs/MM SCF was charged at a rate of about 100 mls per minute in an upflow direction through a vertical iron pellet treater containing a bed of SULFURTRAP 3/16 inch siderite pellets. The treater temperature was 100 deg. F. and the treater pressure was 100 psig. The inlet and outlet compositions of the gas are set forth in Table 29 below:

TABLE 29

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 0.73 | 601.8 | 0.68 | 0.01 | 1.95 | 0.38 | 0.01 |
| Outlet | 0.45 | 0.05 | 0.54 | 0.01 | 0.01 | 0.01 | 0.01 |
| % Reduction | 38.2 | 100.0 | 21.1 | 0.0 | 99.5 | 97.4 | 0.0 |

EXAMPLE 30

A stream of bottled gas mixture containing 95.219% air, 4.619% carbon dioxide and 0.162% hydrogen sulfide was charged at a rate of about 100 mls per minute in an upflow direction through a vertical iron pellet treater containing a bed of SULFURTRAP ⅛ inch siderite pellets. The treater temperature was 100 deg. F. and the treater pressure was 100 psig. The inlet and outlet compositions of the gas are set forth in Table 30 below:

TABLE 30

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 0.61 | 1620.7 | 0.45 | 0.01 | 1.54 | 0.23 | 0.01 |
| Outlet | 0.34 | 0.08 | 0.33 | 0.01 | 0.01 | 0.01 | 0.01 |
| % Reduction | 45.4 | 100.0 | 27.53 | 0.0 | 99.4 | 95.6 | 0.0 |

EXAMPLE 31

A stream of acid gas mixture containing 94.960% air, 4.860% carbon dioxide and 0.180% hydrogen sulfide with an inlet gas moisture content of 128.4 lbs/MM SCF was charged at a rate of about 100 mls per minute in an upflow direction through a vertical iron pellet treater containing a bed of SULFURTRAP 3/16 inch siderite pellets. The treater temperature was 100 deg. F. and the treater pressure was 100 psig. The inlet and outlet compositions of the gas are set forth in Table 31 below:

TABLE 31

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 1.6 | 1795.7 | 1.38 | 0.01 | 1.43 | 0.08 | 0.01 |
| Outlet | 0.97 | 0.22 | 1.26 | 0.01 | 0.01 | 0.01 | 0.01 |
| % Reduction | 39.5 | 100.0 | 8.8 | 0.0 | 99.3 | 86.7 | 0.0 |

EXAMPLE 32

A stream of acid gas mixture containing 94.960% air, 4.860% carbon dioxide and 0.180% hydrogen sulfide with an inlet gas moisture content of 128.4 lbs/MM SCF was charged at a rate of about 100 mls per minute in an upflow direction through a vertical iron pellet treater containing a bed of SULFURTRAP ⅛ inch siderite pellets. The treater temperature was 100 deg. F. and the treater pressure was 100 psig. The inlet and outlet compositions of the gas are set forth in Table 32 below:

TABLE 32

| Treater Sample | Front End Sulfurs | | | | Thiols | | |
|---|---|---|---|---|---|---|---|
| Points | COS | $H_2S$ | $CS_2$ | DMDS | Methyl | Ethyl | 1-Propyl |
| Inlet | 1.6 | 1795.7 | 1.38 | 0.01 | 1.43 | 0.08 | 0.01 |
| Outlet | 0.62 | 0.21 | 0.94 | 0.01 | 0.01 | 0.01 | 0.01 |
| % Reduction | 61.1 | 100.0 | 32.1 | 0.0 | 99.3 | 86.7 | 0.0 |

EXAMPLE 33

A stream of acid gas mixture containing 89.736% air, 9.932% carbon dioxide and 0.332% hydrogen sulfide with an inlet gas moisture content greater than 150 lbs/MM SCF was charged at a rate of about 100 mls per minute in an upflow direction through a vertical iron pellet treater containing a bed of SULFURTRAP 3/16 inch siderite pellets. The treater temperature was 100 deg. F. and the treater pressure was 100 psig. The inlet and outlet compositions of the gas are set forth in Table 33 below:

TABLE 33

| Treater Sample Points | Front End Sulfurs | | | | Thiols | | |
|---|---|---|---|---|---|---|---|
| | COS | H₂S | CS₂ | DMDS | Methyl | Ethyl | 1-Propyl |
| Inlet | 8.32 | 3316.5 | 2.79 | 0.01 | 0.98 | 0.03 | 0.01 |
| Outlet | 0.71 | 0.01 | 2.63 | 0.01 | 0.01 | 0.01 | 0.01 |
| % Reduction | 91.5 | 100.0 | 5.8 | 0.0 | 99.0 | 69.7 | 0.0 |

EXAMPLE 34

A stream of acid gas mixture containing 89.736% air, 9.932% carbon dioxide and 0.332% hydrogen sulfide with an inlet gas moisture content greater than 150 lbs/MM SCF was charged at a rate of about 100 mls per minute in an upflow direction through a vertical iron pellet treater containing a bed of SUD CHEMIE siderite pellets. The treater temperature was 100 deg. F. and the treater pressure was 100 psig. The inlet and outlet compositions of the gas are set forth in Table 34 below:

TABLE 34

| Treater Sample Points | Front End Sulfurs | | | | Thiols | | |
|---|---|---|---|---|---|---|---|
| | COS | H₂S | CS₂ | DMDS | Methyl | Ethyl | 1-Propyl |
| Inlet | 8.32 | 3316.5 | 2.79 | 0.01 | 0.98 | 0.03 | 0.01 |
| Outlet | 1.09 | 0.01 | 2.20 | 0.01 | 0.01 | 0.01 | 0.01 |
| % Reduction | 86.9 | 100.0 | 21.1 | 0.0 | 99.0 | 69.7 | 0.0 |

EXAMPLE 35

A stream of acid gas mixture containing 90.882% air, 8.596% carbon dioxide and 0.522% hydrogen sulfide with an inlet gas moisture content of 112.6 lbs/MM SCF was charged at a rate of about 200 mls per minute in an upflow direction through a vertical iron pellet treater containing a bed of SULFURTRAP 3/16 inch siderite pellets. The treater temperature was 100 deg. F. and the treater pressure was 100 psig. The inlet and outlet compositions of the gas are set forth in Table 35 below:

TABLE 35

| Treater Sample Points | Front End Sulfurs | | | | Thiols | | |
|---|---|---|---|---|---|---|---|
| | COS | H₂S | CS₂ | DMDS | Methyl | Ethyl | 1-Propyl |
| Inlet | 1.23 | 5218.9 | 3.92 | 0.01 | 1.72 | 0.13 | 0.01 |
| Outlet | 0.95 | 0.03 | 3.56 | 0.01 | 0.01 | 0.01 | 0.01 |
| % Reduction | 22.7 | 100.0 | 9.2 | 0.0 | 99.4 | 92.1 | 0.0 |

EXAMPLE 36

A stream of acid gas mixture containing 90.882% air, 8.596% carbon dioxide and 0.522% hydrogen sulfide with an inlet gas moisture content of 112.6 lbs/MM SCF was charged at a rate of about 200 mls per minute in an upflow direction through a vertical iron pellet treater containing a bed of SUD CHEMIE siderite pellets. The treater temperature was 100 deg. F. and the treater pressure was 100 psig. The inlet and outlet compositions of the gas are set forth in Table 36 below:

TABLE 36

| Treater Sample Points | Front End Sulfurs | | | | Thiols | | |
|---|---|---|---|---|---|---|---|
| | COS | H₂S | CS₂ | DMDS | Methyl | Ethyl | 1-Propyl |
| Inlet | 1.23 | 5218.9 | 3.92 | 0.01 | 1.72 | 0.13 | 0.01 |
| Outlet | 1.65 | 0.01 | 3.16 | 0.01 | 0.01 | 0.01 | 0.01 |
| % Reduction | -34.3 | 100.0 | 19.2 | 0.0 | 99.4 | 92.1 | 0.0 |

EXAMPLE 37

A stream of acid gas mixture containing 90.125% air, 9.437% carbon dioxide and 0.438% hydrogen sulfide with an inlet gas moisture content of 86.2 lbs/MM SCF was charged at a rate of about 600 mls per minute in an upflow direction through a vertical iron pellet treater containing a bed of SULFURTRAP 3/16 inch siderite pellets. The treater temperature was 100 deg. F. and the treater pressure was 100 psig. The inlet and outlet compositions of the gas are set forth in Table 37 below:

TABLE 37

| Treater Sample Points | Front End Sulfurs | | | | Thiols | | |
|---|---|---|---|---|---|---|---|
| | COS | H₂S | CS₂ | DMDS | Methyl | Ethyl | 1-Propyl |
| Inlet | 1.14 | 4378.5 | 3.71 | 0.01 | 1.39 | 0.31 | 0.01 |
| Outlet | 0.94 | 0.03 | 2.39 | 0.01 | 0.01 | 0.01 | 0.01 |
| % Reduction | 12.7 | 100.0 | 35.4 | 0.0 | 99.3 | 96.8 | 0.0 |

EXAMPLE 38

A stream of acid gas mixture containing 90.125% air, 9.4376% carbon dioxide and 0.438% hydrogen sulfide with an inlet gas moisture content of 86.2 lbs/MM SCF was charged at a rate of about 600 mls per minute in an upflow direction through a vertical iron pellet treater containing a bed of SULFURTRAP 1/8 inch siderite pellets. The treater temperature was 100 deg. F. and the treater pressure was 100 psig. The inlet and outlet compositions of the gas are set forth in Table 38 below:

TABLE 38

| Treater Sample Points | Front End Sulfurs | | | | Thiols | | |
|---|---|---|---|---|---|---|---|
| | COS | H₂S | CS₂ | DMDS | Methyl | Ethyl | 1-Propyl |
| Inlet | 1.14 | 4378.5 | 3.71 | 0.01 | 1.39 | 0.31 | 0.01 |
| Outlet | 1.84 | 0.03 | 3.26 | 0.01 | 0.01 | 0.01 | 0.01 |
| % Reduction | -61.5 | 100.0 | 12.0 | 0.0 | 99.3 | 96.8 | 0.0 |

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventor is legally entitled.

We claim:

1. A method for regenerating ferrous carbonate absorbent used to remove sulfur-containing compounds from a liquid, gas, or mixed gas and liquid stream by periodically contacting the absorbent with air and steam in combination with the stream under conditions equivalent to a temperature of about 100° F. and a pressure of about 100 psig.

2. A method for removing sulfur from an acid gas stream comprising sulfur-containing compounds by combining the stream with an oxygen-containing gas and water vapor and passing the combined stream through a bed of ferrous carbonate absorbent wherein the water vapor content of the combined stream ranges from about 40 to about 150 pounds of water per million standard cubic feet.

3. The method of claim 2 wherein the acid gas stream comprises hydrogen sulfide.

4. A method for removing sulfur from a liquid, gas or mixed gas and liquid stream comprising sulfur-containing compounds by passing the stream through a bed of ferrous carbonate absorbent in a moist air environment under conditions equivalent to a temperature of about 100° F. and a pressure of about 100psig.

5. A method for continuously regenerating a ferrous carbonate absorbent used to remove sulfur from a liquid, gas or mixed gas and liquid stream comprising sulfur-containing compounds by subjecting the ferrous carbonate to moist air or to oxygen and water vapor in combination with the stream during absorption and wherein the water vapor content of the combined stream ranges from about 40 to about 150 pounds of water per million standard cubic feet.

6. The method of claim 5 wherein the sulfur is removed as elemental sulfur.

7. The method of claim 1 wherein the ferrous carbonate absorbent is siderite.

8. The method of claim 2 wherein the ferrous carbonate absorbent is siderite.

9. The method of claim 4 wherein the ferrous carbonate absorbent is siderite.

10. The method of claim 5 wherein the ferrous carbonate absorbent is siderite.

\* \* \* \* \*